United States Patent
Cernohous et al.

(10) Patent No.: US 10,745,562 B2
(45) Date of Patent: Aug. 18, 2020

(54) GRAFTED POLYETHYLENE

(71) Applicant: SACO AEI Polymers, Inc., Sheboygan, WI (US)

(72) Inventors: Jeffrey Jacob Cernohous, Hudson, WI (US); David Geraint Roberts, Sheboygan Falls, WI (US); Neil R. Granlund, Columbia Heights, MN (US)

(73) Assignee: SACO AEI POLMERS, INC., Sheboygan, WI (US)

( * ) Notice: Subject to any disclaimer, the term of this patent is extended or adjusted under 35 U.S.C. 154(b) by 115 days.

(21) Appl. No.: 15/678,913

(22) Filed: Aug. 16, 2017

(65) Prior Publication Data
US 2018/0030275 A1 Feb. 1, 2018

Related U.S. Application Data

(63) Continuation of application No. 14/764,876, filed as application No. PCT/US2014/025513 on Mar. 13, 2014, now abandoned.

(60) Provisional application No. 61/783,177, filed on Mar. 14, 2013.

(51) Int. Cl.
*C08F 255/02* (2006.01)
*C08L 91/06* (2006.01)
*C08L 51/06* (2006.01)

(52) U.S. Cl.
CPC ............ *C08L 91/06* (2013.01); *C08F 255/02* (2013.01); *C08L 51/06* (2013.01)

(58) Field of Classification Search
CPC ......... C08F 255/02; C08L 51/06; C08L 91/06
See application file for complete search history.

(56) References Cited

U.S. PATENT DOCUMENTS

| | | | |
|---|---|---|---|
| 3,243,395 A | 3/1966 | Coover, Jr. | |
| 4,612,155 A | 9/1986 | Wong et al. | |
| 4,616,059 A | 10/1986 | Motooka et al. | |
| 5,310,806 A | 5/1994 | Wild et al. | |
| 6,300,398 B1 * | 10/2001 | Jialanella | C08L 23/0815 524/275 |
| 2005/0154115 A1 | 7/2005 | Krupinski | |
| 2007/0129498 A1 | 6/2007 | Curry | |
| 2010/0305259 A1 | 12/2010 | Rodriguez et al. | |
| 2011/0111243 A1 | 5/2011 | Laiho et al. | |

FOREIGN PATENT DOCUMENTS

EP 0324883 A1 * 7/1989
JP 2009-120714 6/2009

OTHER PUBLICATIONS

Raj, R.G. et al. Journal of Applied Polymer Science vol. 37 pp. 1089-1103 (Jan. 20, 1989).*
ASTM D1238 information sheet downloaded from http://www.instron.us/en-us/testing-solutions/by-test-type/rheology/astm-d1238 on Jun. 25, 2016.
Database WPI, Week 201323, Thompson Scientific, London, GB; AN 2013-A79400, XP-002767000, 3 pps.—Abstract of Chinese patent document CN 102702436.
Polyethylene composition and properties downloaded from http://www.plasticmoulding.ca/polymers/plyethylene.htm on Jun. 25, 2016.
Written Opinion regarding International Application No. PCT/US201/025513, dated Jul. 15, 2014, 5 pages.

* cited by examiner

*Primary Examiner* — Irina S Zemel
*Assistant Examiner* — Jeffrey S Lenihan
(74) *Attorney, Agent, or Firm* — Foley & Lardner LLP

(57) ABSTRACT

Grafted polyethylene polymers and copolymers are reactively extruded to achieve enhanced rheological properties. The utilization of an oligomeric or polymeric wax in the reactive extrusion process with functionalized agents, results in improved rheological characteristics of the grafted polymer.

20 Claims, No Drawings

GRAFTED POLYETHYLENE

CROSS-REFERENCE TO RELATED APPLICATIONS

This application is a continuation of U.S. patent application Ser. No. 14/764,876, filed on Jul. 30, 2015, which is a U.S. national stage of PCT application Ser. No. PCT/US2014/025513, filed on Mar. 13, 2014, which claims the priority of U.S. Provisional Application Ser. No. 61/783,177, filed on Mar. 14, 2013, the entire contents of which are hereby incorporated by reference, for any and all purposes.

TECHNICAL FIELD

This disclosure is related to the modification of the rheological properties of polyethylene or polyethylene copolymers.

BACKGROUND

Polyolefins are commonly modified by reactive extrusion. The modification is often desirable in order to facilitate the blending of the generally incompatible polyolefins with other polymers. Reactive extrusion functionalizes the polyolefins and thus is a method typically employed to overcome their incompatibility issue with other polymers. Most polyolefins, such as polypropylene, upon grafting have desirable functional rheological properties that permit secondary manipulation or formation of a desired end product. However, the rheological properties of polyethylene or polyethylene copolymers generally change to a less desirable state. One characteristic of grafted polyethylene polymers and copolymers is that their melt flow index decreases upon grafting when compared to the polymer in the ungrafted state.

SUMMARY

In the grafting of functional monomers with polyethylene polymers and copolymers, it is generally recognized that the rheological properties of the resulting grafted polymers will not be in the most efficient or effective state for secondary processing. This disclosure is directed at the use of oligomeric or polymeric waxes incorporated into the reactive extrusion process for forming grafted polyethylene polymers and copolymers with enhanced rheological properties.

The utilization of an oligomeric or polymeric wax during the reactive extrusion of polyethylene polymers or polyethylene copolymers, functionalizing agents, and free radical initiators during reactive extrusion practices results in grafted polyethylene polymers or polyethylene copolymers that have enhanced rheological properties. One particular convention for measuring rheological properties of a polymeric melt is the melt flow index, as specified under ASTM D1238. In certain embodiments, the grafted polyethylene polymers or polyethylene copolymers, produced in accordance with this disclosure, exhibit melt flow indices ("MFI") of at least 50% greater when compared to the functionalized polyethylene copolymer produced in the absence of an oligomeric or polymeric wax. Other non-limiting examples of rheological properties that may also be enhanced include melt viscosity, melt transition temperature ($T_m$), glass transition temperature ($T_g$), and the storage modulus (G') and/or loss modulus (G") at a specified temperature or shear rate.

The grafted polyethylene polymers and copolymers are suitable for various applications such as compatibilizers, coupling agents, viscosity modifiers, surface modifiers, lubricants, impact modifiers and tie-layers. The grafted polyethylene polymers have specific application as coupling agents for glass, mineral or natural fiber filled polyolefins. By controlling or tailoring the rheology of the grafted polyethylene, it is possible to improve the effectiveness and performance in such composite systems. In one embodiment, it is desirable to increase the melt flow index and subsequent flow properties of the grafted polyethylene polymer to improve the likelihood of successful interfacial bonding during melt processing of the composite system. In another embodiment, it is important to tailor the rheology of the grafted polyethylene polymer in order to match the rheology of the polymer matrix the additive is being blended into. In another embodiment, it is important to tailor the rheology of the grafted polyethylene polymer in a tie-layer application in order to match the rheology of other polymers being simultaneously coextruded with the grafted polyethylene polymer.

DETAILED DESCRIPTION

Enhanced or improved rheological properties of polyethylene polymers or copolymers is contemplated by a melt processable polymeric composite derived from the combination of a polyethylene or polyethylene copolymer, an oligomeric or polymeric wax, a functionalized agent, and a free radical initiator. Melt processing the polyolefin or polyolefin copolymer with an oligomeric or polymeric wax, maleic anhydride, and a functionalized agent forms a grafted polyethlyene polymer or polyethylene copolymer with desirable and improved rheological properties.

Polyethylene or polyethylene copolymers function as the host polymer and are a component of the melt processable composition subjected to the reactive extrusion process along with the other components. A wide variety of polyethylene polymers and copolymers conventionally available and suitable for melt processing are useful. The polyethylene or polyethylene copolymers may comprise from about 20% to about 90% by weight of the entire composition. A non-limiting example of a commercially available polymer includes Dowlex IP40, high density polyethylene from Dow Chemical Corporation, Midland, Mich. Other conventional low density and linear low density polyethylene polymers or copolymers are suitable as well. The polyethylene or polyethylene copolymers may comprise from about 20% to about 90% by weight of the entire composition.

Oligomeric or polymeric waxes are generally those low molecular weight waxes that have a weight average molecular weight of less than 50,000 g/mol, and are compatible with the polyethylene matrix during melt processing. In some embodiments, the low molecular weight wax has a weight average molecular weight of less than 20,000 g/mol. In most preferred embodiments, the low molecular weight wax has a weight average molecular weight of less than 10,000 g/mol. Non-limiting examples of oligomeric and polymeric waxes include, polyethylene waxes, polypropylene waxes, triglyceride waxes, diglyceride waxes, monoglyceride waxes, fatty acid waxes, fatty amide waxes, and metal stearates.

The amount of oligomeric or polymeric wax present in the melt processable composition is dependent upon several variables, such as for example, the polyethylene polymer or copolymer, the type of functionalizing agent, the type of melt processing equipment, the processing conditions, and others. Those of ordinary skill in the art with knowledge of this disclosure are capable of selecting an appropriate amount of oligomeric or polymeric wax to achieve the desired result. In certain embodiments, the oligomeric or polymeric wax is used at 0.01 to 80 wt % by weight of the melt processable composition.

In other embodiments, the oligomeric or polymeric wax is used at 1.0 to 50 wt % by weight of the melt processable composition.

Functionalizing agents enable the incorporation of a reactive moiety onto the backbone of the polyethylene polymers and polyethylene copolymers. The resulting functionalized polyethylene polymer or copolymer can have utility as an interfacial modifier (e.g., compatibilizer, coupling agent, surface modifier, tie-layer). The grafting process that takes place in the melt is accomplished by free radical grafting of an unsaturated polar monomer or functionalizing agent onto the polyethylene polymer or copolymer. Non-limiting examples of functionalized agents include ethylenically unsaturated monomers having a reactive group. Examples include functionalized acrylates, methacrylates, stryenics, dienes and olefins. The reactive group may be any electrophilic or nucleophilic reactive moiety. Non-limiting examples of reactive groups include: amines, amides, esters, carboxylic acids, carboxylic acid halides, anhydrides, imides, alcohols, isocyanates, oxazolines, epoxides and silanes. The functionalizing agents may be included in the melt processable composition in amounts ranging from about 0.1% to about 10% by weight. In certain embodiments, the functionalized agent may be included at about 0.5% to about 5% by weight.

A free radical initiator is a species that, when melt processed, forms reactive free radical moieties that influence the grafting process in the extruder. Free radical initiators useful in the grafting process include organic peroxides and diazocompounds. Non-limiting examples of specific free radical initiators include: benzoyl peroxide, dicumyl peroxide, di-tert-butyl peroxide and azoisobutrylnitrile. The free radical initiator may be included in the melt processable composition at amounts less than 1% by weight.

The melt processable composition can be prepared by any of a variety of ways. For example, the polyethylene polymers and polyethylene copolymers, the oligomeric or polymeric wax, and the functionalized agent can be combined together by any of the blending means usually employed in the plastics industry.

Melt-processing typically is performed at a temperature from 120° to 300° C., although optimum operating temperatures are selected depending upon the melting point, melt viscosity, and thermal stability of the composition. Different types of melt processing equipment, such as extruders, may be used to process the melt processable compositions of this invention. In one embodiment, an extruder is utilized to enable a reactive extrusion of the components. Those of ordinary skill in the art in polymer processing are able to select appropriate operating conditions based upon the specific materials utilized for forming the grafted polyethylene or polyethylene copolymer.

In some embodiments, the melt processing and reactive extrusion is performed in a twin screw extruder. In another embodiment, the reactive extrusion is performed in a co-rotating, segmented twin screw extruder. In such instances, it is preferable that the length:diameter of the twin screw extruder is at least 32:1. In yet another embodiment, the length:diameter of the twin screw extruder is at least 40:1. Those who are skilled in the art will recognize preferred screw designs and temperature profiles to achieve optimal reactive extrusion to produce the grafted polyethylene or polyethylene copolymers.

The resulting grafted polyethylene or polyethylene copolymers possess desirable rheological characteristics. For example, grafted polyethylene polymers and polyethylene copolymers made in accordance with this disclosure can exhibit enhanced or improved melt flow indices as measured in accordance with ASTM D1238. The grafted polyolefin or polyethylene copolymer has a melt flow index value according to ASTM D1238 of at least 50% greater value than the melt flow index of a grafted polyethylene or polyethylene copolymer produced in the absence of the oligomeric or polymeric wax. In certain embodiments, the melt flow index is at least 100% greater and may be at least 200% greater.

In other embodiments, rheological properties such as flexural strength, flexural modulus, tensile strength, tensile modulus, tensile elongation, moisture resistance and impact properties may be enhanced.

The grafted polyethylene polymers and copolymers are suitable for various applications such as compatibilizers, coupling agents, viscosity modifiers, surface modifiers, lubricants, impact modifiers and tie-layers.

EXAMPLES

| Material | Supplier |
|---|---|
| PE1 | Dowlex IP40, high density polyethylene, commercially available from Dow Chemical Corporation, Midland, MI. |
| Wax 1 | Bareco C4040 polymer, polyethylene wax, commercially available from Baker Petrolite Corporation, Sugarland, TX. |
| Maleic Anhydride | Commercially available from Aldrich Chemical Co., Milwaukee, WI. |
| DHBP | 2,5-Dimethyl-2,5-di(tertbutyl peroxy) hexane, commercially available from United Initiators, Elyria, OH. |

Compounding Procedure for CE1 and Examples 1-2

For Comparative Example CE1 and examples 1-2, polyethylene resin, wax, maleic anhydride and DHBP were dry blended in a plastic bag and fed using a gravimetric feeder into a 26 mm co-rotating twin screw extruder (40:1, L:D) fitted with a four strand die (commercially available from Lab Tech Engineering, Samutprakarn, Thailand). All samples were processed at 250 rpm screw speed using the following temperature profile: Zone 1-2=160° C., Zone 3-4=190° C., Zone 5-6=210° C., Zone 7-8=190° C., 9-10=180° C. Die=170° C. The resulting strands were subsequently continuously processed into a room temperature water bath and pelletized into 0.64 cm pellets. The resulting pellets were tested for melt flow index following ASTM D1238. The test was performed at 190° C. with a 2.2 Kg mass.

Table 1 gives the formulations for comparative example CE1 and Examples 1-2. Table 2 gives the properties for comparative example CE1 and Examples 1-2.

TABLE 1

Formulation for CE1 and Examples 1-2

| Compatibilizer | PE1 | Wax | Maleic Anhydride | DHBP |
|---|---|---|---|---|
| CE1 | 97.9 | — | 2 | 0.1 |
| 1 | 72.9 | 25 | 2 | 0.1 |
| 2 | 47.9 | 50 | 2 | 0.1 |

TABLE 2

Properties of Formulation CE1 and Examples 1-2

| Example | Melt Flow Index (g/10 min) |
|---|---|
| CE1 | 1.20 |
| 1 | 12.30 |
| 2 | 102.70 |

What is claimed is:

1. A composition comprising a melt processable grafted polymer composition derived from melt processing a combination of:
   (i) 47.9 to 72.9 wt. % of a polyethylene or polyethylene copolymer (polyethylene (co)polymer), which comprises high density polyethylene, low density polyethylene and/or linear low density polyethylene;
   (ii) 25 to 50 wt. % of an oligomeric or polymeric wax having a weight average molecular weight of less than 10,000 g/mol, wherein the oligomeric or polymeric wax is a polyethylene wax, polypropylene wax, triglyceride wax, diglyceride wax, monoglyceride wax, fatty acid wax, fatty amide wax, metal stearates or combinations thereof;
   (iii) 0.5 to 5 wt. % of a functionalized agent, which includes an ethylenically unsaturated monomer having a reactive group, wherein the reactive group is a carboxylic acid and/or carboxylic anhydride; and
   (iv) a free radical initiator;
   wherein the melt processable grafted polymer composition has a melt flow index greater than a melt flow index of a corresponding grafted polyethylene (co)polymer produced in the absence of the oligomeric or polymeric wax.

2. The composition of claim 1, wherein the free radical initiator includes organic peroxides or diazo compounds.

3. The composition of claim 1, wherein the oligomeric or polymeric wax comprises polyethylene wax, polypropylene wax, or combinations thereof.

4. The composition of claim 1, wherein the polyethylene (co)polymer includes high density polyethylene; and the oligomeric or polymeric wax includes polyethylene wax; and the functionalized agent includes maleic anhydride.

5. The composition of claim 1, wherein the polyethylene (co)polymer comprises high density polyethylene; the oligomeric and/or polymeric wax comprises polyethylene wax, polypropylene wax or a mixture thereof; the functionalized agent comprises maleic anhydride.

6. A method of producing the composition according to claim 1 comprising melt processing the polyethylene (co)polymer with the oligomeric or polymeric wax, the functionalized agent, and the free radical initiator to form a grafted polyethylene (co)polymer.

7. The method according to claim 6, wherein the functionalized agent comprises maleic anhydride; the oligomeric or polymeric wax comprises polyethylene wax; and the polyethylene (co)polymer comprises high density polyethylene resin.

8. The composition of claim 1, wherein the composition further comprises a glass, mineral and/or natural fiber filled polyolefin.

9. A melt processable, grafted polymer composition formed by melt processing a mixture comprising (a) 47.9 to 72.9 wt. % high density polyethylene; (b) about 25 to 50 wt. % of an oligomeric and/or polymeric wax having a weight average molecular weight of less than 10,000 g/mol; (c) 0.5 to 5 wt. % of a functionalized agent, which includes an ethylenically unsaturated monomer having a carboxylic acid and/or carboxylic anhydride group; and (d) free radical initiator; wherein the melt processable grafted polymer composition has a melt flow index greater than a melt flow index of a corresponding grafted polyethylene (co)polymer produced in the absence of the oligomeric or polymeric wax.

10. The composition of claim 9, wherein the functionalized agent includes maleic anhydride.

11. The composition of claim 9, wherein the mixture comprises about 25 to 50 wt. % polyethylene wax having a weight average molecular weight of less than 10,000 g/mol; and about 0.5 to 5 wt. % maleic anhydride.

12. The composition of claim 9, wherein the oligomeric and/or polymeric wax comprises polyethylene wax and/or polypropylene wax.

13. The composition of claim 9, wherein the mixture is a mixture of high density polyethylene (HDPE), polyethylene wax, maleic anhydride; and the free radical initiator.

14. The composition of claim 9, wherein the oligomeric and/or polymeric wax comprises polyethylene wax; and the functionalized agent comprises maleic anhydride.

15. The composition of claim 9, wherein the melt processable, grafted polymer composition has a melt flow index value according to ASTM D1238 at 190° C. with a 2.2 Kg mass of at least a 200% greater value than a melt flow index of a corresponding grafted polyethylene produced in an absence of the oligomeric or polymeric wax.

16. A melt processable, grafted polymer composition formed by melt processing a mixture comprising (a) 47.9 to 72.9 wt. % polyethylene (co)polymer; (b) about 25 to 50 wt. % of an oligomeric and/or polymeric wax having a weight average molecular weight of less than 10,000 g/mol; (c) 0.5 to 5 wt. % of an ethylenically unsaturated monomer having a reactive group, wherein the reactive group is a carboxylic acid and/or carboxylic anhydride; and (d) free radical initiator;
   wherein the oligomeric and/or polymeric wax comprises polyethylene wax, polypropylene wax, triglyceride wax, diglyceride wax, monoglyceride wax, fatty acid wax, and/or fatty amide wax; and
   the melt processable grafted polymer composition has a melt flow index greater than a melt flow index of a corresponding grafted polyethylene (co)polymer produced in the absence of the oligomeric or polymeric wax.

17. The composition of claim 16, wherein the mixture comprises 47.9 to 72.9 wt. % high density polyethylene; and the ethylenically unsaturated monomer includes maleic anhydride; and the oligomeric and/or polymeric wax includes the polyethylene wax and/or the polypropylene wax.

18. The composition of claim 16, wherein the polyethylene (co)polymer is high density polyethylene; the oligomeric and/or polymeric wax is polyethylene wax; the ethylenically unsaturated monomer having a reactive group maleic anhydride.

19. A melt processable grafted polymer composition derived from melt processing a mixture comprising:
   (i) 47.9 to 72.9 wt. % of polyethylene and/or polyethylene copolymer (polyethylene (co)polymer), which comprises high density polyethylene, low density polyethylene and/or linear low density polyethylene;
   (ii) about 25 to 50 wt. % of an oligomeric or polymeric wax having a weight average molecular weight of less than 10,000 g/mol;

(iii) about 0.5 to 5 wt. % of an ethylenically unsaturated monomer having a carboxylic acid and/or carboxylic anhydride group; and
(iv) free radical initiator; wherein the melt processable grafted polymer composition has a melt flow index greater than a melt flow index of a corresponding grafted polyethylene (co)polymer produced in the absence of the oligomeric or polymeric wax.

20. The composition of claim 19, wherein the polyethylene (co)polymer comprises high density polyethylene; the oligomeric or polymeric wax comprises polyethylene wax, polypropylene wax or a mixture thereof; the ethylenically unsaturated monomer comprises maleic anhydride.

* * * * *